United States Patent
Saitoh (10) Patent No.: US 7,068,343 B2
(45) Date of Patent: Jun. 27, 2006

(54) ELECTRO-OPTICAL PANEL, ELECTRO-OPTICAL PANEL MODULE, AND PROJECTION DISPLAY DEVICE

(75) Inventor: Hiromi Saitoh, Chino (JP)

(73) Assignee: Seiko Epson Corporation, Tokyo (JP)

( * ) Notice: Subject to any disclaimer, the term of this patent is extended or adjusted under 35 U.S.C. 154(b) by 264 days.

(21) Appl. No.: 10/608,475

(22) Filed: Jun. 30, 2003

(65) Prior Publication Data

US 2004/0085492 A1 May 6, 2004

Related U.S. Application Data

(62) Division of application No. 09/455,447, filed on Dec. 6, 1999, now Pat. No. 6,731,367.

(30) Foreign Application Priority Data

Dec. 4, 1998 (JP) .......................................... 10-345539

(51) Int. Cl.
G02F 1/1333 (2006.01)
G02F 1/1335 (2006.01)

(52) U.S. Cl. ...................... 349/158; 349/110; 349/153
(58) Field of Classification Search ................ 349/158, 349/153, 110
See application file for complete search history.

(56) References Cited

U.S. PATENT DOCUMENTS

| 5,745,202 | A | * | 4/1998 | Yamauchi et al. .......... 349/110 |
| 5,757,443 | A | * | 5/1998 | Kobayashi ...................... 349/5 |
| 5,875,011 | A | | 2/1999 | Pierson et al. |
| 6,172,730 | B1 | * | 1/2001 | Fujita ......................... 349/149 |
| 6,822,706 | B1 | * | 11/2004 | Gomi et al. ................ 349/110 |

FOREIGN PATENT DOCUMENTS

| JP | 01-302386 A | 12/1989 |
| JP | 02-095379 U | 7/1990 |
| JP | 05-034655 A | 2/1993 |
| JP | 06-258637 A | 9/1994 |
| JP | 9-105901 | 4/1997 |
| JP | 09-113906 A | 5/1997 |
| JP | 9-113906 | 5/1997 |
| JP | 10-123964 A | 5/1998 |
| JP | 10-232629 A | 9/1998 |
| JP | 63-264720 A | 11/1998 |
| JP | 11-052325 A | 2/1999 |
| JP | 11-084350 A | 3/1999 |
| JP | 11-149254 A | 6/1999 |
| JP | 14-387949 A | 11/2002 |

* cited by examiner

Primary Examiner—Toan Ton
(74) Attorney, Agent, or Firm—Oliff & Berridge, PLC

(57) ABSTRACT

The end surfaces of a transparent substrate to be adhered to an element-formed substrate are disposed outwardly of the corresponding end surfaces of the element-formed substrate, and the end surfaces of a transparent substrate to be adhered to an opposite substrate are disposed outwardly of the corresponding end surfaces of the opposite substrate, so that stepped portions are formed, with an adhesion portion being formed between the corresponding end surfaces. As a result, in the case where a surface of the element-formed substrate and a surface of the transparent substrate to be adhered to the element-formed substrate are adhered together and a surface of the opposite substrate and a surface of the transparent substrate to be adhered to the opposite substrate are adhered together with a transparent adhesive, an amount by which the transparent adhesive protrudes beyond the end surfaces is greatly reduced, and any portion of the transparent adhesive which has overflown outwardly of any of the adhered surfaces can be retained by the corresponding stepped portion, making it possible to prevent further spreading of the transparent adhesive.

6 Claims, 7 Drawing Sheets

ELECTRO-OPTICAL PANEL, ELECTRO-OPTICAL PANEL MODULE, AND PROJECTION DISPLAY DEVICE

This is a Division of application Ser. No. 09/455,447 filed Dec. 6, 1999, now U.S. Pat. No. 6,731,367, which claims the benefit of priority of Japanese Patent Application 10-345539 filed Dec. 4, 1998. The entire disclosure of the prior application is hereby incorporated by reference herein in its entirety.

BACKGROUND OF THE INVENTION

1. Field of Invention

The present invention relates to an electro-optical panel, an electro-optical panel module, and a projection display device, and, more particularly, to an electro-optical panel structure suitable for use as a light valve of the projection display device.

2. Description of Related Art

An electro-optical panel for performing light modulation to form a predetermined image is sometimes used in a projection display device such as a liquid crystal projector. Here, a condensing optical system and an enlarging projection optical system are provided. The condensing optical system is provided to cause light from a light source to strike the electro-optical panel. The enlarging projection optical system is provided to project the light that has passed through the electro-optical panel onto a projection surface, such as a screen, and form an enlarged image. The light condensed by the condensing optical system passes through the electro-optical panel, resulting in the formation of the predetermined image, which is projected towards the front by the enlarging projection optical system.

However, when dust sticks onto the outer surface of two transparent substrates making up the above-described electro-optical panel or when the outer surface of the two transparent substrates get scratched, the outer surface of the transparent substrates are brought to a focus, since the outer surface of the transparent substrates are separated from a liquid crystal layer of the electro-optical panel that is brought to a focus by the condensing optical system by only about 1 mm. Therefore, the above-described electro-optical panel has the problem that the quality of a projected image is considerably reduced even when the dust or scratches which get enlarged and projected are only about 10 µm to 20 µm in size.

In the projection display device, the electro-optical panel is irradiated with intense light generated from a light source, so that a localized temperature rise tends to occur in the electro-optical panel. Since such temperature rise changes the light transmittance ratio of some liquid crystals, display quality is reduced. In addition, such temperature rise causes deterioration in electro-optical substances such as the aforementioned liquid crystals.

In view of these problems, Japanese Unexamined Patent Publication Nos. □9-105901 and 9-113906 disclose a technology which increases heat dissipating capability and which prevents dust from sticking onto and scratches from being formed on the outer surface of a transparent substrate of an electro-optical panel. In this technology, another transparent substrate is disposed away from the aforementioned transparent substrate of the electro-optical panel, with an adhesive being used and applied to the outer surface of the transparent substrate of the electro-optical panel. When another transparent substrate is disposed, an air gap is formed between the transparent substrates separated from each other, so that heat dissipating capability is increased. In addition, when another transparent substrate is disposed, it is possible to prevent dust from sticking onto and scratches from being formed on the outer surface of the transparent substrate of the electro-optical panel. However, when this technology is used, another transparent substrate is disposed away from the transparent substrate of the electro-optical panel, so that light is reflected at the interface between the electro-optical panel and the air gap and at the interface between the transparent substrate disposed away from the transparent substrate of the electro-optical panel and the air gap. This results in such problems as loss of a large amount of light, and the necessity of performing an additional step to form a reflection prevention film onto the substrate surfaces in order to prevent reflection of light.

Figure 6:
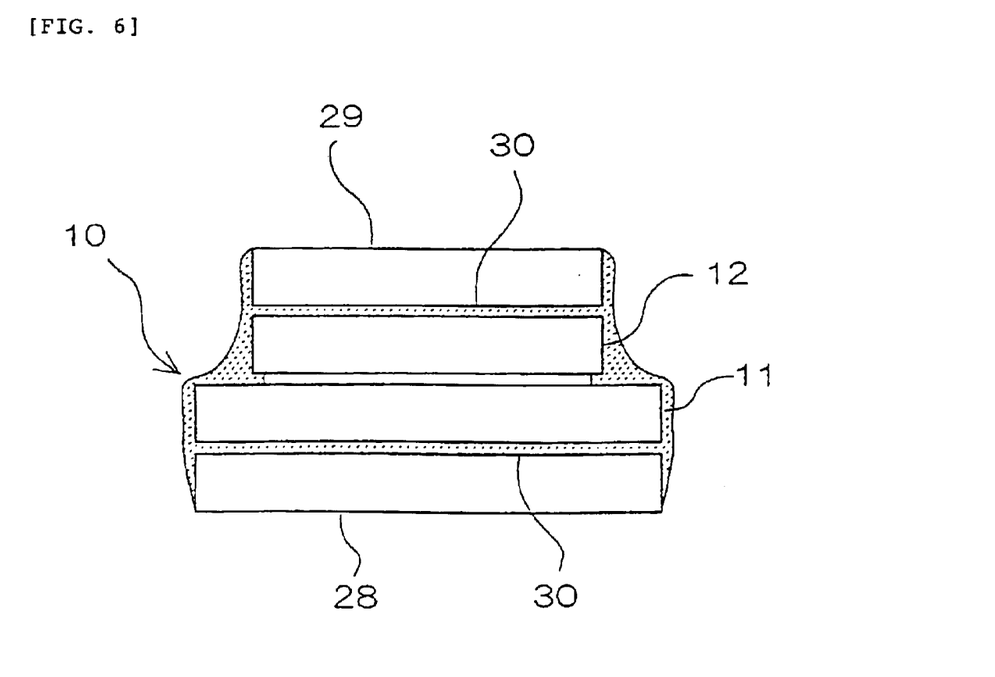
FIG. 6 is a schematic structural view of an ordinary electro-optical panel (comparative example) in which pieces of dust-resistant glass are adhered at their surfaces.

In order to overcome the above-described problems, the present inventor has conducted various studies on methods of adhering a surface of another substrate onto the outer surface of a transparent substrate of an electro-optical panel, using a transparent adhesive. An application of a method based on such studies has already been filed. FIG. 6 is a schematic view of the structure of an electro-optical panel based on this method. In the electro-optical panel, liquid crystals, which are electro-optical substances, are filled and sealed with a sealant (not shown) between an element-formed substrate 11 (having a pixel electrode and an active element formed on the inner surface thereof) and an opposite substrate 12 (having an electrode that opposes the pixel electrode and that is formed on the inner surface thereof) that opposes the element-formed substrate 11. A surface of a transparent substrate 28 is adhered to the outer surface of the element-formed substrate 11 with a transparent adhesive 30, while a surface of a transparent substrate 29 is adhered to the outer surface of the opposite a surface of a transparent substrate 29 is adhered to the outer surface of the opposite substrate 12 with a transparent adhesive 30. However, when this method is used, the transparent adhesives 30 do not allow flexing of the electro-optical panel, and must have refractive indices of light which are substantially the same as those of the element-formed substrate 11, the opposite substrate 12, and the transparent substrates 28 and 29, so that there is a limit as to the kind of adhesive material which can be used. The adhesive material used must have low viscosity and must possess flowing properties to a certain extent after it has hardened. Therefore, as shown in FIG. 6, after the surfaces of the corresponding substrates have been adhered together, the transparent adhesives 30 flow outwardly from adhesion portions between the corresponding substrates. Consequently, during the manufacturing process or after completion of the manufacturing process, it becomes difficult to handle the electro-optical panel. In addition, since the transparent adhesives 30 tend to accidentally stick onto the outer surface of the transparent substrates 28 and 29, the electro-optical panel produced tends to be defective.

SUMMARY OF THE INVENTION

To overcome the above-described problems, it is an object of the present invention provides a novel structure which makes it possible to facilitate handling of electro-optical panels and to reduce the number of defective electro-optical panels as a result of reducing the amount of transparent adhesive overflowing from the electro-optical panels by changing the form of a transparent substrate, in the case where a surface of another transparent substrate is adhered to the outer surface of a transparent substrate of the electro-optical panels with transparent adhesives.

To this end, according to a first aspect of the present invention, there is provided an electro-optical panel which includes:

a first substrate, a second substrate, an electro-optical substance sandwiched between an inside surface of the first substrate and an inside surface of the second substrate, a third substrate bonded at an outer side of at least one of the first substrate and the second substrate with an adhesive, and a stepped portion formed by disposing an end surface of the first substrate and an end surface of the third substrate out of line with respect to each other, with the first substrate and the third substrate opposing each other with the adhesive being disposed therebetween.

In such a structure, even when scratches are formed on or dust sticks onto the outer surface of the first substrate, the dust or scratches separate from the electro-optical substance and defocusing occurs when a surface of the third substrate is adhered to, for example, the first substrate. Therefore, it is possible to prevent the display quality from being reduced; to increase the heat capacity of the electro-optical panel; and to reduce the extent to which the display quality is deteriorated by overheating of the electro-optical substance. In addition, when a stepped portion is formed by an end surface of the first substrate and an end surface of the third substrate (with an adhesion portion being formed therebetween), any adhesive which flows from the transparent substrates is collected and retained by the stepped portion as long as the amount of adhesive which flows from between the transparent substrates falls within a certain range, thus preventing adhesives from flowing outwardly of the stepped portion. Therefore, during the manufacturing process or after the manufacturing process, it is possible to eliminate the problem of difficulty in handling the electro-optical panel caused by an adhesive sticking onto an outer surface of the electro-optical panel, or the production of a defective product caused by an adhesive sticking onto a light-transmissive portion of the electro-optical panel. Further, since the adhesive hardens while it is collected at the stepped portion, the first substrate and the third substrate can be adhered more strongly together.

The stepped portion may be formed by forming the first substrate and the third substrate with different sizes as viewed in a plane.

In such a structure, a stepped portion can be formed by simply changing the size of the first substrate and the third substrate, making it unnecessary to perform special processing operations on the end surfaces of the substrates.

When the stepped portion is formed by forming the first substrate and the third substrate with different sizes as viewed in a plane, the third substrate may be larger than the first substrate, with an end surface of the first substrate being disposed inwardly of an end surface of the third substrate.

In such a structure, an end surface of the first substrate is disposed inwardly of an end surface of the third substrate. In other words, the third substrate is formed larger than the first substrate so as to extend beyond it. Therefore, even if any adhesive flows out of the electro-optical panel, the amount of adhesive flowing out of the electro-optical panel can be reduced, since the third substrate is formed so as to cover the first substrate.

According to a second aspect of the present invention, there is provided an electro-optical panel including: a first substrate, a second substrate, an electro-optical substance sandwiched between an inner side of the first substrate and an inner side of the second substrate, a third substrate adhered to an outer surface of the first substrate with an adhesive, and a groove formed in a peripheral portion of a surface of at least one of the first substrate and the third substrate where the adhesive is applied.

In such a structure, even if any adhesive overflows from the substrates, the overflown adhesive can be collected and retained by the stepped portion as long as the amount of adhesive that has overflown from the substrates falls within a certain range. Thus, the overflown adhesive can be prevented from flowing out of the groove. Consequently, during the manufacturing process or after the manufacturing process, it is possible to eliminate the problem of difficulty in handling the electro-optical panel caused by an adhesive sticking onto an outer surface of the electro-optical panel. In addition, since the adhesive hardens while it is collected in the groove, the first substrate and the third substrate can be adhered together more strongly.

The end surface of at least one of the first substrate and the third substrate may have an inclined surface portion which inclines towards an inner side of the substrate with the inclined surface portion.

In such a structure, an inclined surface portion is formed on an end surface of at least one of the first substrate and the third substrate, so that a wider area for collecting the overflowing adhesive can be provided. Therefore, it is possible to prevent the adhesive from flowing out of the electro-optical panel.

The inclined surface portion may be formed on a portion of the end surface at the adhesive-applied side of at least one of the first substrate and the third substrate in a direction of thickness thereof.

In such a structure, the inclined surface portion allows any adhesive which has overflown from the substrates to be collected there. In addition, since the inclined surface portion is formed on a portion of the end surface at the adhesive-applied side of at least one of the first substrate and the third substrate, the remaining portion of the end surface where the inclined surface portion is not formed can be formed perpendicular to a plane of the first substrate or the third substrate as is ordinarily the case, so that the electro-optical panel can be gripped by the end surface and positioned using the end surface.

The stepped portion may be formed by positioning the first substrate and the third substrate out of line with respect to each other in a direction in a plane, and adhering their surfaces together.

In such a structure, since a stepped portion can be formed by an end surface of the first substrate and an end surface of the third substrate even when the third substrate is formed to a size equal to that of the first substrate, no special processing operations whatever need to be performed on the substrates.

The refractive index of light of the third substrate and that of the transparent adhesive may be substantially the same as the refractive index of light of the first substrate.

In such a structure, reflection of light at the interface between the transparent adhesive and the third transparent substrate can be reduced.

The transparent adhesive may be resilient after it has hardened.

In such a structure, the use of a transparent adhesive which is resilient even after it has hardened makes it possible to reduce distortion of the substrates caused by application of stress generated during hardening of the transparent adhesive.

The angle of penetration of the adhesive after it has hardened may be from 60 degrees to not more than 90 degrees.

In such a structure, it is possible to prevent distortion of the substrates by reducing the amount of transparent adhesive flowing from the substrates to a minimum and letting the transparent adhesive itself absorb the stress.

The adhesive may have a thickness of from 5 µm to 30 µm.

In such a structure, it is possible to hide the dust or scratches on the substrates by the adhesive by forming it to a thickness equal to or greater than 5 µm. When the adhesive is formed to a thickness equal to or less than 10 µm, the adhesive strength can be made sufficiently high.

According to a third aspect of the present invention, there is provided an electro-optical panel module including: any one of the above-described electro-optical panels, a wiring member connected to any one of the above-described electro-optical panels so as to allow electrical conduction, and a case member for accommodating any one of the above-described electro-optical panels therein.

In such a structure, it is possible to reduce the amount of adhesive flowing from the substrates by the case member.

According to a fourth aspect of the present invention, there is provided a projection display device including: any one of the above-described electro-optical panels, or the above-described electro-optical panel module used as a liquid crystal light valve.

The projection display device includes a condensing optical system for condensing light emitted from a light source at any one of the above-described electro-optical panels; and an enlarging projection optical system for enlarging and projecting the light that has passed through any one of the above-described electro-optical panels and that has been modulated thereby onto a projection surface, such as a screen.

The present invention is highly effective when it is applied, in particular, to a projection display device which is greatly affected by scratches or dust on the outer surface of a substrate of an electro-optical panel, and whose electro-optical panel tends to overheat.

According to another aspect of the present invention, there is provided an electro-optical panel comprising a first substrate, a second substrate adhered to the first substrate with a sealant, an electro-optical substance sandwiched between the first substrate and the second substrate, a third substrate disposed on the outer side of at least one of the first substrate and the second substrate, wherein, the size of the third substrate is larger than the size of the first substrate, and the position of the end surface of the first substrate is inner than that of the third substrate, and the shielding member is disposed on the third substrate, along the peripheral of the third substrate.

In the aforementioned structure, the external form of the third substrate is larger than that of the first substrate, and further, the light shielding member is disposed along the peripheral region of the third substrate. Thus, it is possible to block off the light which is going to obliquely enter the electro-optical panel.

Further, in the aforementioned structure, the incident light from the the third substrate side travels through the first substrate and then is emitted from the second substrate. The light shielding member is disposed so as to cover and extend outward over the sealant, as viewed in plane.

Still further, according to the aforementioned structure, the light shielding member extends outward over the sealant. Thus in the case that, for example, a thin film transistor is formed in the display area on the first substrate, it is possible to prevent the scattered light occurring at the sealant from entering into the thin film transistors or the like, thereby also preventing the deterioration of the thin film transistor characteristics.

According to another aspect of the present invention, the incident light from the third substrate side travels through the first substrate and then is emitted from the second substrate side. A shielding film is disposed on at least one of the first substrate and the second substrate so that the position of the shielding film is inner than that of the sealant. The shielding member overlaps with the shielding film as viewed in a plane, and extends outward over the sealant.

In the aforementioned structure, the shielding film, which is positioned inner than the sealant, and the shielding member overlap with each other, as viewed in a plane. Therefore, it is possible to block off the light generated around the display area and prevent the linkage of the light. As a result, the display images has high contract, and undesirable effects on the panel due to the light leakage and the deterioration of thin film transistor characteristics can be prevented.

According to the another aspect of the present invention, the light shielding member is disposed on a side of the third substrate facing the electro-optical substance.

In the aforementioned structure, the gap between the shielding film, which is provided on the inward side of the sealant, and the shielding member is smaller than the same in the case that the shielding member is provided on the other side of the third substrate, namely the side the opposite to the side facing the electro-optical substance. Therefore, the positioning of the light shielding film and the light shielding member is performed easily so as to overlap each other.

According to the another aspect of the present invention, the light shielding member is disposed on the rear side of the third substrate the other side of which faces the electro-optical substance.

In the aforementioned structure, the shielding member is disposed on the peripheral region of the third substrate. This structure is more effective in blocking off the light, which is going to enter the sealant obliquely.

According to another aspect of the present invention, the surface of the first substrate is adhered to the surface of the third substrate with adhesive.

In the aforementioned structure, air layer does not exist since the surface of the first substrate and the surface of the third substrate are adhered to each other with adhesive. Therefore, the light reflection generating at the interface between the panel and the air layer can be prevented. Further, according to the aforementioned structure, the third substrate, which is provided on the outer side of the first substrate, is larger than the first substrate. Accordingly, even if the adhesive flows out, the amount of adhesive flowing out of the electro-optical panel can be reduced.

It is to be noted that in the above-described electro-optical panels, it is preferable to adhere a surface of the third substrate to the outer surface of the second transparent substrate with a transparent adhesive, too.

DETAILED DESCRIPTION OF PREFERRED EMBODIMENTS

Figure 1:
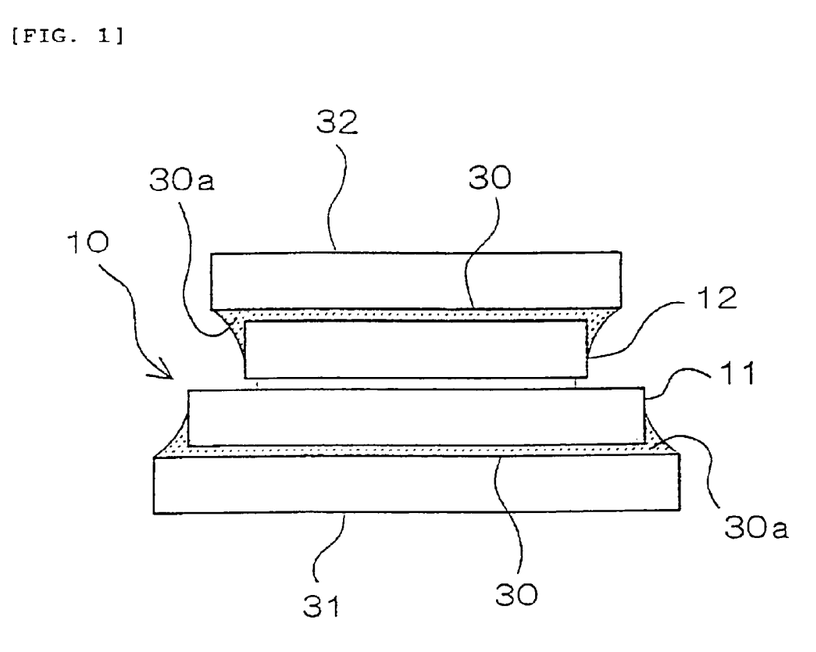
FIG. 1 is a schematic structural view of a first embodiment of the electro-optical panel in accordance with the present invention.

A detailed description of embodiments of the present invention will now be given with reference to the drawings.
Overall Structure of the Electro-Optical Panel FIG. 1 is a schematic structural view of a first embodiment of the electro-optical panel in accordance with the present invention. In the embodiment, the electro-optical panel 10 is formed by sandwiching a liquid crystal layer between the inner side of a transparent substrate 11 and the inner side of a transparent substrate 12. The transparent substrate 11 is formed of, for example, glass. It has a pixel electrode and an active element formed on the inner surface thereof. (The transparent substrate 11 will hereunder be referred to as "element-formed substrate 11.") The transparent substrate 12 is also formed of, for example, glass. It opposes the element-formed substrate 11, and has an opposing electrode formed on the inner surface thereof. (The transparent substrate 12 will hereunder be referred to as "opposite substrate 12.") In the electro-optical panel 10, a surface of a transparent substrate 31 is adhered to the outer surface of the element-formed substrate 11 with a transparent adhesive 30. Similarly, a surface of a transparent substrate 32 is adhered to the outer surface of the opposite substrate 12 with a transparent adhesive 30. The transparent substrate 31 has a refractive index of light which is substantially equal to that of the element-formed substrate 11. It is preferably formed of exactly the same material as that used to form the element-formed substrate 11. Similarly, the transparent substrate 32 has a refractive index of light which is substantially equal to that of the opposite substrate 12. It is preferably formed of exactly the same material as that used to form the opposite substrate 12.

When the surfaces of the element-formed substrate 11 and the transparent substrate 31 are adhered together, the transparent adhesive 30 used has a refractive index of light which is substantially equal to those of the element-formed substrate 11 and the transparent substrate 31, and is transparent after it has hardened. Similarly, when the surfaces of the opposite substrate 12 and the transparent substrate 32 are adhered together, the transparent adhesive 30 used has a refractive index of light which is substantially equal to those of the opposite substrate 12 and the transparent substrate 32, and is transparent after it has hardened.

When quartz substrates (with a refractive index of light=1.46) are used for the element-formed substrate 11 and the opposite substrate 12, quartz substrates may similarly be used for the transparent substrates 31 and 32 in order to make their refractive indices of light match those of their respective element-formed substrate 11 and the opposite substrate 12. When, as mentioned above, quartz substrates are used for the substrates 11, 12, 31, and 32, silicone adhesives or acrylic adhesives whose refractive index of light is adjusted to a value of 1.46 may be used for the transparent adhesives 30.

Obviously, when highly heat-resistant glass plates that have a refractive index of 1.54 such as neo-serum glass plates or the like are used for the element-formed substrate 11 and the opposite substrate 12, highly heat-resistant glass plates formed of the same material may also be used for the transparent substrates 31 and 32. In this case, the aforementioned silicone adhesives or acrylic adhesives whose refractive index is adjusted to a value of 1.54 may be used for the transparent adhesives 30.

In the embodiment, the quartz substrates used for the element-formed substrate 11 and the opposite substrate 12 may have a thickness of 1.2 mm and 1.1 mm, respectively. The quartz substrates used for the transparent substrates 31 and 32 may have a thickness of 1.1 mm. For the transparent adhesives 30, it is preferable that their thickness fall in a range of from 5 to 30 μm. In particular, when their thickness is equal to or greater than 5 μm, scratches or dust on the substrates can be hidden. When the thickness is equal to or less than 10 μm, the adhesive strength can be made sufficiently high.

In the step of adhering a surface of the transparent substrate 31 and a surface of the transparent substrate 32 to the aforementioned electro-optical panel 10, the transparent adhesives 30 are dripped onto and applied to the inside surfaces of the transparent substrates 31 and 32 and to the outer surfaces of the element-formed substrate 11 and the opposite substrate 12. Then, the element-formed substrate 11 and the transparent substrate 31 are placed upon each other by first bringing the surface of the transparent adhesive 30 applied to the element-formed substrate 11 and the surface of the transparent adhesive 30 applied to the transparent substrate 31 into contact with each other, in order to push them against each other. At the same time, the opposite substrate 12 and the transparent substrate 32 are placed upon each other by first bringing a surface of the transparent adhesive 30 applied to the opposite substrate 12 and the surface of the transparent adhesive 30 applied to the transparent substrate 32 into contact with each other, in order to push them against each other. When the respective transparent substrates 11 and 31 and the respective transparent substrates 12 and 32 are pushed against each other, the transparent adhesives 30 between their respective substrates 11 and 31 and between their respective substrates 12 and 32 are pressed outward to a larger area. Thereafter, the transparent adhesives 30 are hardened. When the above-described step is performed, air bubbles do not remain in the interior of the transparent adhesives 30, making it possible to eliminate the problem of reduced display quality caused by air bubbles. It is to be noted that the step of adhering substrates can be performed either before or after the step of assembling an electro-optical panel 10.

Here, for the transparent adhesives 30, it is preferable to use adhesives that are resilient even after they have hardened. If the penetration index of the transparent adhesives 30 after they have hardened is equal to or greater than 90 the adhesives 30 flow from the substrates 11, 12, 31, 32 when they are hardening, so that a suitable amount of transparent adhesives 30 cannot be kept on the substrates 11, 12, 31, and 32. If the penetration index is less than 60, stress produced when the transparent adhesives 30 are hardening cannot be absorbed thereby, so that deformation occurs between the substrates 11 and 31 and between substrates 12 and 32. Therefore, it is preferable that the penetration index of the transparent adhesives 30 after they have hardened be in the range of from 60 to not more than 90.

In the embodiment, the area of the transparent substrate 31 is larger than the area of the element-formed substrate 11 of the electro-optical panel 10. Similarly, the area of the transparent substrate 32 is larger than the area of the opposite substrate 12. In other words, if the element-formed substrate 11 and the opposite substrate 12 are substantially rectangular and planar in shape, each side of the transparent substrate 31 is longer than its respective side of the element-formed substrate 11, and each side of the transparent substrate 32 is longer than its respective side of the opposite substrate 12. Therefore, all of the end surfaces of the transparent substrate 31 are disposed outwardly of the respective end surfaces of the element-formed substrate 11. Similarly, all of the end surfaces of the transparent substrate 32 are disposed outwardly of the respective end surfaces of the opposite substrate 12. Consequently, stepped portions are formed by end surfaces of the element-formed substrate 11 and end surfaces of the transparent substrate 31, with adhesion portions 30a being formed between the element-formed substrate 11 and the transparent substrate 31. Similarly, stepped portions are formed by end surfaces of the opposite substrate 12 and end surfaces of the transparent substrate 32, with adhesion portions 30a being formed between the opposite substrate 12 and the transparent substrate 32. (The adhesion portions 30a correspond to the end portions of the adhesion layers formed between the element-formed substrate 11 and the transparent substrate 31 adhered together at their surfaces and between the opposite substrate 12 and the transparent substrate 32 adhered together at their surfaces.) As a result, in the case where, as described above, surfaces of the element-formed substrate 11 and the transparent substrate 31, and surfaces of the opposite substrate 12 and the transparent substrate 32 are adhered together with the transparent adhesives 30, even when portions of the transparent adhesives 30 overflow outwardly of the adhered surfaces of the element-formed substrate 11 and the transparent substrate 31 and the adhered surfaces of the opposite substrate 12 and the transparent substrate 32, the overflown transparent adhesives 30 are stopped by the aforementioned stepped portions, as long as the amount of transparent adhesives 30 protruding from the adhered surfaces fall within a certain range. Therefore, as shown in FIG. 1, the transparent adhesives 30 are retained so that the extent of further spreading thereof is reduced, in accordance with the surface tension of the transparent adhesives 30 and wettability thereof with respect to the substrate surfaces. Since the transparent substrates 31 and 32, which are larger than the respective element-formed substrate 11 and the opposite substrate 12, cover their respect substrates 11 and 12 planewise, it is possible to prevent a person from directly touching the overflown transparent adhesives 30.

In order to retain portions of the transparent adhesives 30 protruding from the adhered surfaces of the transparent substrates 11 and 31 and the adhered surfaces of the transparent substrates 12 and 32 by the stepped portions, it is necessary to control the amount of transparent adhesives 30 to a certain extent. Since the margin of the amount of transparent adhesives 30 can be made sufficiently large by enlarging the stepped portions, it is actually easy to prevent the transparent adhesives 30 from overflowing the stepped portions. After dripping the transparent adhesives 30 onto the substrates 11, 12, 31, and 32 and adhering the two substrates 11 and 31 and the two substrates 12 and 32 together, any transparent adhesive 30 which has overflown from an outer edge of any of the substrates 11, 12, 31, and 32 can be absorbed by an absorbing device or the like. In this case, however, additional transparent adhesive 30 may flow out after the absorption of the overflown transparent adhesive 30 by the absorbing device or after hardening. Since this problem does not occur in the present embodiment, the present embodiment is very effective in preventing overflowing of transparent adhesives 30 from the electro-optical panel 10. In addition, during hardening of the transparent adhesives 30, their viscosity may temporarily be reduced. This increases the flowability of the transparent adhesives 30. Since this problem does not occur in the present embodiment either, the present embodiment is very effective in preventing overflowing of transparent adhesives 30 from the electro-optical panel 10.

By retaining the transparent adhesives 30 at the stepped portions as described above, the element-formed substrate 11 and the transparent substrate 31, and the opposite substrate 12 and the transparent substrate 32 are firmly adhered together at their end portions. This makes it possible to increase adhesive strength between the element-formed substrate 11 and the transparent substrate 31 and between the opposite substrate 12 and the transparent substrate 32, allowing more reliable and firmer adhesion of the transparent substrates 31 and 32.

Internal Structure of the Electro-Optical Panel

Figure 7:
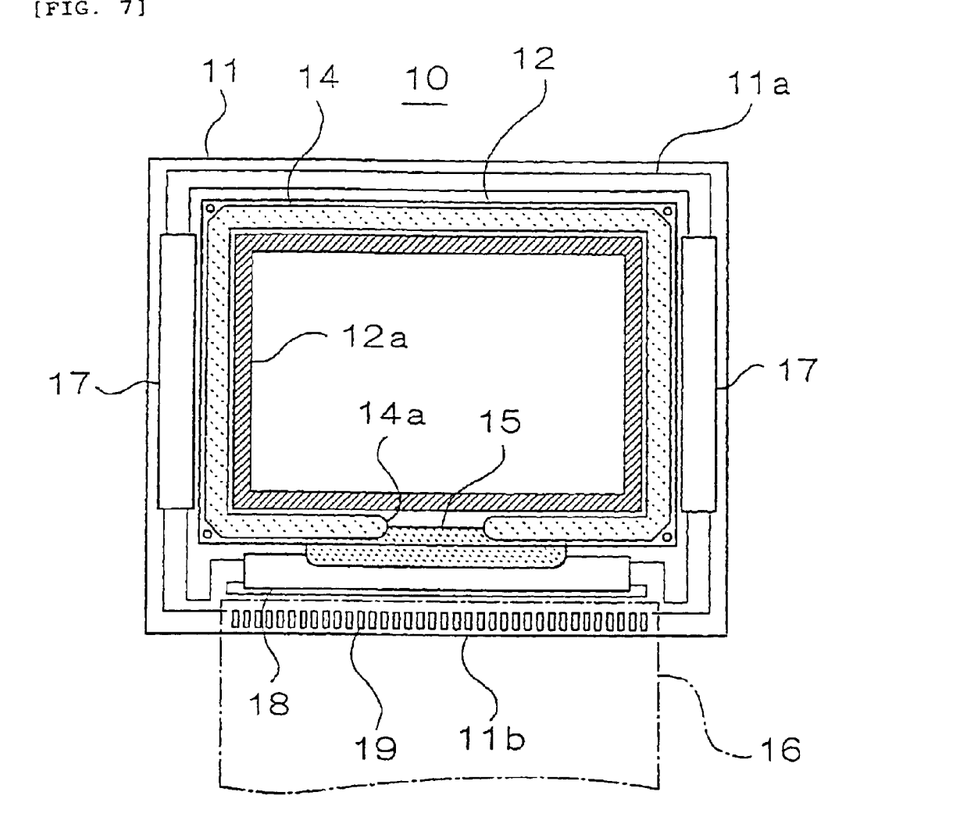
FIG. 7 is a perspective view schematically illustrating the internal structure of the electro-optical panels of the embodiments, as seen in a plane.
Figure 8:
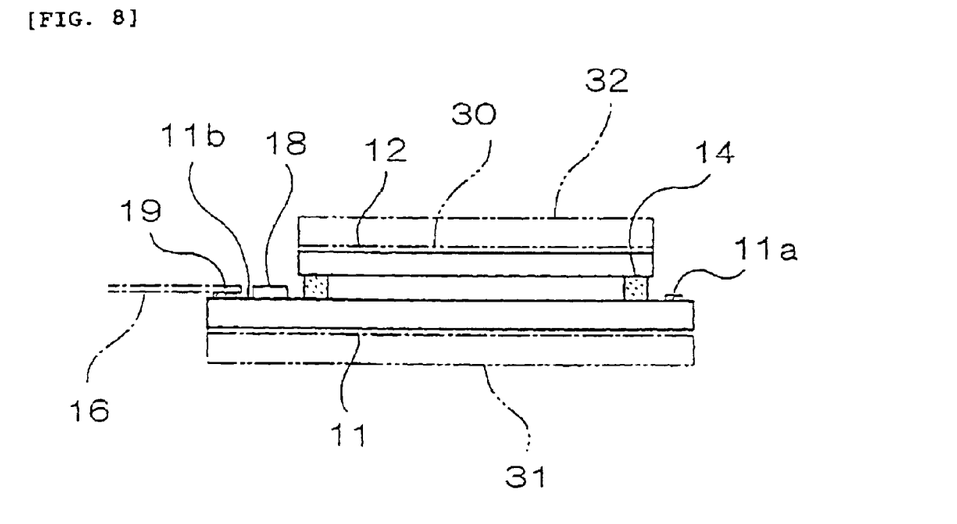
FIG. 8 is a sectional view schematically illustrating the internal structure of the electro-optical panels of each of the embodiments.

A simple description will now be given of the internal structure of the above-described electro-optical panel 10 of the foregoing embodiment. A detailed structure of the electro-optical panel 10 is illustrated in FIGS. 7 and 8. In the embodiment, it is to be noted that as described later a polarizer is disposed at a liquid crystal projector side, so that it may not be disposed at the electro-optical panel 10. On the inner surface of the element-formed substrate 11 are disposed in a known pattern an active element, such as a thin film transistor (TFT), a pixel electrode, a wiring layer, etc. An alignment layer is applied to the top portion of this pattern, and is rubbed in a predetermined direction. On the other hand, an electrode opposing the pixel electrode is formed on the inner surface of the opposite substrate 12. (This electrode will hereinafter referred to as "opposing electrode.") Similarly, an alignment layer is applied to the top portion of the opposing electrode, and is rubbed. The element-formed substrate 11 and the opposite substrate 12 are adhered together with a sealant 14. The sealant 14 used is often a photosetting resin or the like. The element-formed substrate 11 and the opposite substrate 12 are aligned to such an extent that the interval between them can be kept at a predetermined value (approximately 3 to 10 μm). The sealant 14 is hardened by irradiating it with light. Then, in a vacuum, liquid crystals are injected within the inner sides of the sealant 14 from an opening 14a thereof. After injecting the liquid crystals, with the substrates 11 and 12 being kept parallel to each other, the opening 14a is sealed with a sealant 15 formed of resin. A predetermined external wiring pattern 11a is previously formed on the inner surface of the element-formed substrate 11 with a larger area. An external terminal portion 11b, having a plurality of external terminals 19 which are arranged, is formed at an end portion of one side of the element-formed substrate 11. A connection portion of a flexible wiring substrate 16 is connected to the external terminal portion 11b through, for example, an anisotropic, electrically conductive film so as to allow electrical conduction. A light-shielding firm 12a is formed on the inner surface of the opposite substrate 12. It is formed of a metal, such as chromium (Cr). A similar light-shielding film is also formed on the inner surface of the element-formed substrate 11, immediately inwardly of the sealant 14.

Structure of an Electro-Optical Panel Module

Figure 9:
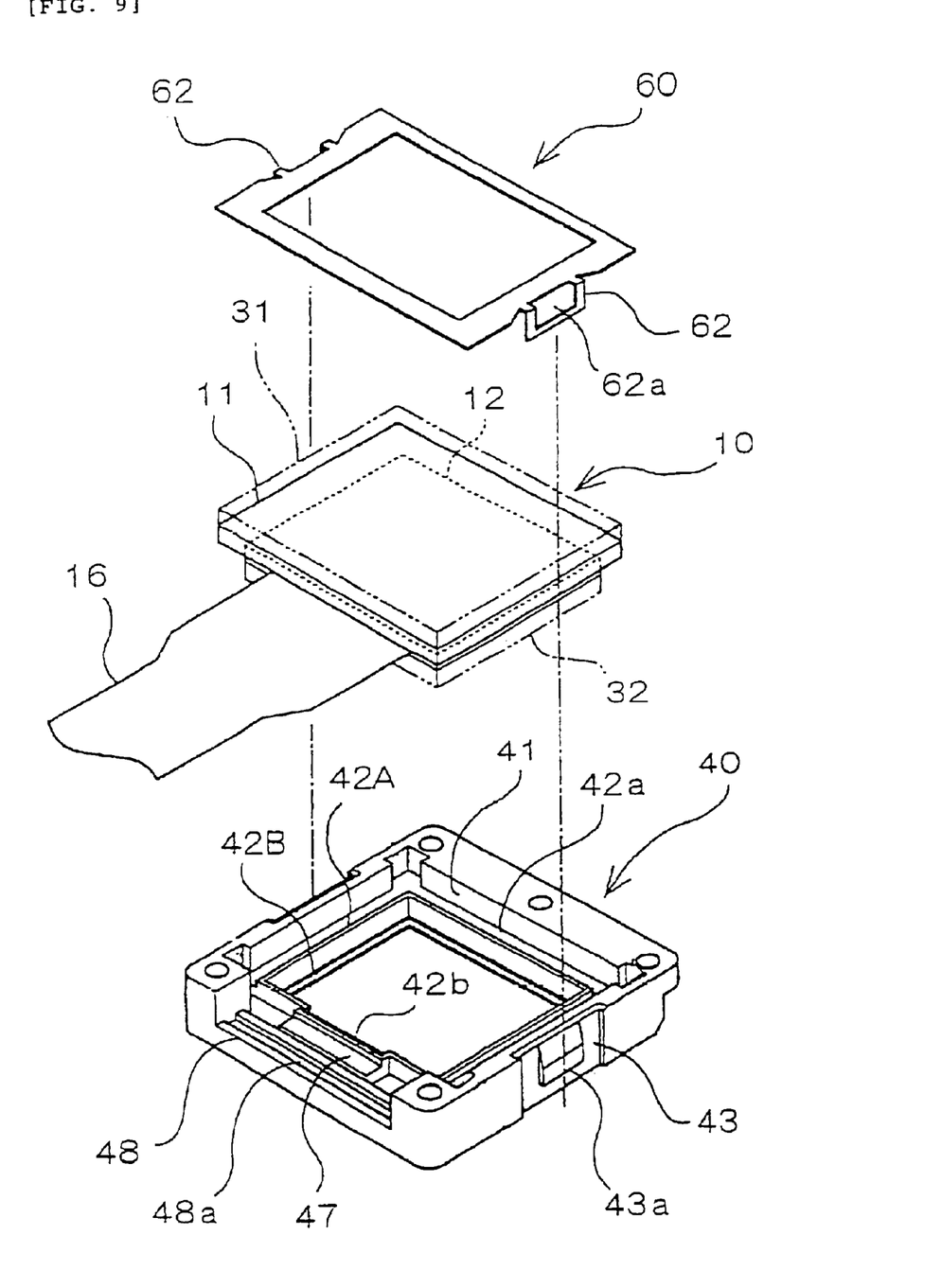
FIG. 9 is an exploded perspective view of the structure of the electro-optical panel modules of each of the embodiments.

FIG. 9 is an exploded perspective view of an electro-optical panel module including the electro-optical panel 10 illustrated in FIGS. 7 and 8. As shown in FIG. 9, the electro-optical panel module is formed by accommodating the electro-optical panel 10 in an accommodating recess 41 in a panel-mounting frame 40 and setting a holding plate 60. Fitting holes 62a are formed in corresponding fitting pieces 62 formed at both ends of the holding plate 60. Fitting protrusions 43a are formed at corresponding fitting portions 43 (formed at corresponding side surfaces of the panel-mounting frame 40) so that they can be fitted to the corresponding fitting holes 62a. An adhesive, whose main component is, for example, silicone rubber (such as silicone RTV (room temperature vulcanization silicone rubber)), is poured between a first stepped portion 42A of the accommodating recess 41 and an area of the element-formed substrate 11 of the electro-optical panel 10 protruding outwardly of the opposite substrate 12. Then, the adhesive is hardened, allowing the electro-optical panel 10 to be secured to the panel-mounting frame 40. Here, for example, the outer surface of the transparent substrate 32 of the electro-optical panel 10 is brought into contact with and positioned at a second stepped portion 42B.

A groove 42b is formed to prevent the sealant 15 shown in FIG. 7 illustrating the electro-optical panel 10 from swelling, and to prevent the electro-optical panel 10, accommodated in the panel-mounting frame 40, from floating. An outer supporting surface portion 48 is provided so as to oppose a surface of the flexible wiring substrate 16 in order to reduce unnecessary deformation of the flexible wiring substrate 16. The flexible wiring substrate 16 can be bonded to the panel-mounting frame 40 by filling a recessed groove 48a formed in the outer supporting surface portion 48 with an adhesive. By virtue of this arrangement, bonding is achieved outwardly of the portion where the flexible wiring substrate 16 and the panel-mounting frame 40 are connected together. This prevents stress from being easily applied to the electrically conductive connection portion, and stress from being easily applied to a portion where the electrically conductive connection portion and the external terminal portion 11b of the electro-optical panel 10 are connected together. Therefore, the external terminal portion 11b and the electrically conductive portion can be connected together more reliably, making it possible to reduce image shifts at the electro-optical panel 10.

As described above, in the embodiment, stepped portions are formed by end surfaces of the element-formed substrate 11 and end surfaces of the transparent substrate 31 and by end surfaces of the opposite substrate 12 and end surfaces of the transparent substrate 32. These stepped portions retain the transparent adhesives 30, and make it possible to reduce the amount of transparent adhesives 30 flowing to the panel-mounting frame 40 and the holding plate 60. Even if any transparent adhesive 30 flows from any of the stepped portions, it can be retained by the recessed groove 48a or the groove 42b formed in the panel-mounting frame 40 of the electro-optical panel module. Therefore, these grooves 42b and 48a are effective in preventing transparent adhesive 30 from flowing out of the panel-mounting frame 40.

Projection Display Device

Figure 10:
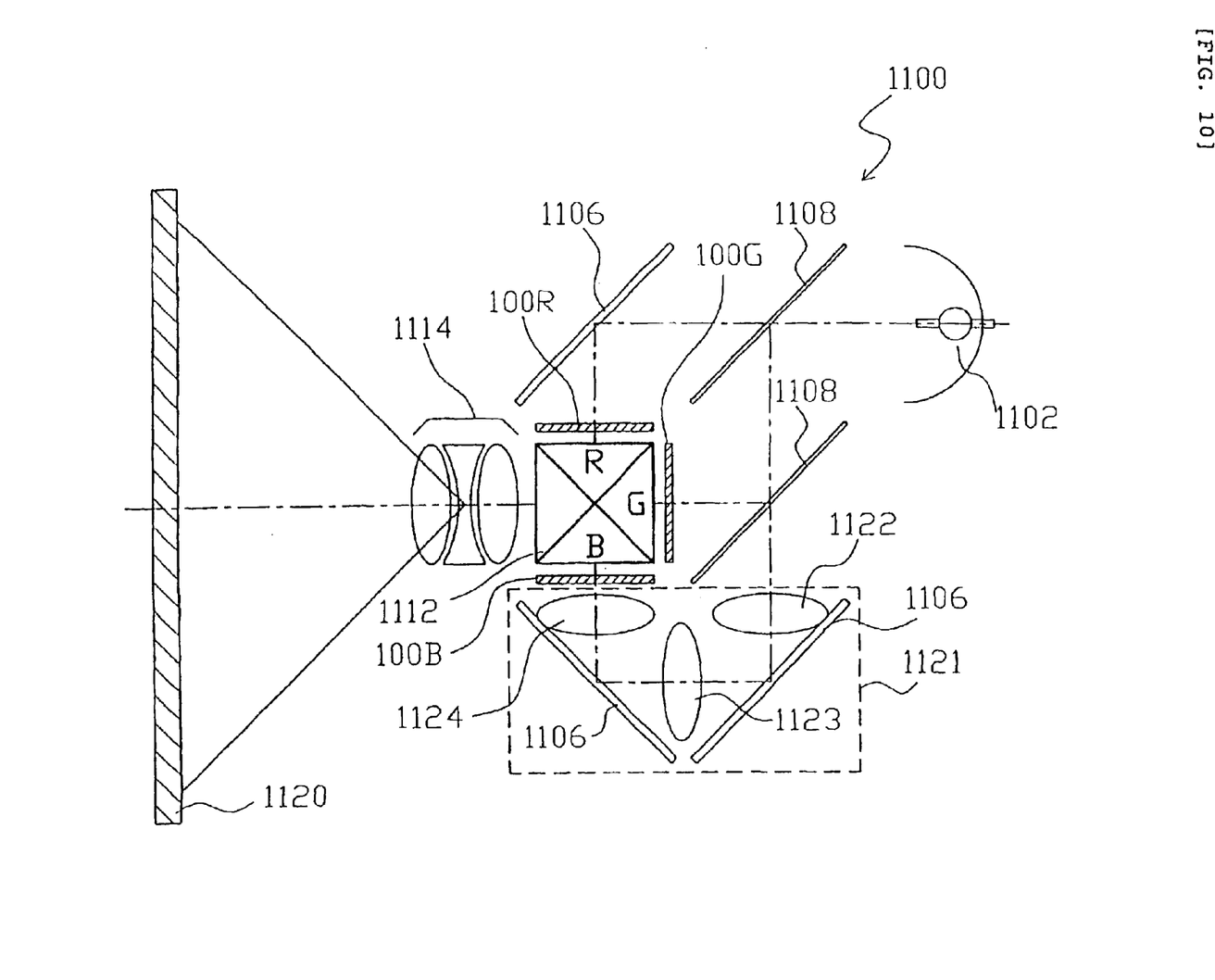
FIG. 10 is a schematic structural view of a liquid crystal projector using the electro-optical panel module of any one of the embodiments.

A description will now be given of a projection display device 1100 using the above-described electro-optical panel module with reference to FIG. 10. Three electro-optical panel modules are provided. They are used as a red (R) light valve 100R, a green (G) light valve 100G, and a blue (B) light valve 100B, respectively, which form the projection display device 1100. In the projection display device 1100, when projection light is emitted from a lamp unit 1102, being a white light source such as a metal halide lamp, it is separated into three light components, red, green, and blue, which correspond to the three primary colors, by three mirrors 1106 and by two dichroic mirrors 1108. Then, the red light, the green light, and the blue light are led to their respective light valves 100R, 100G, and 100B. In order to eliminate the problem of loss of blue light caused by its long optical path, the blue light is led through a relay lens system 1121 which includes a light-incoming lens 1122, a relay lens 1123, and a light-outgoing lens 1124. Thereafter, the light components corresponding to the three primary colors that have been modulated by their respective light valves 100R, 100G, and 100B are resynthesized by a dichroic prism 1112, after which a color image is formed and projected onto a screen 1120 through a projection lens 1114.

In the liquid crystal projector using the electro-optical panel modules (each having the electro-optical panel 10 of the embodiment provided therein) as liquid crystal light valves, it is possible to reduce the amount of transparent adhesive 30 flowing from an outer surface of the panel-mounting frames 40 of the electro-optical panel modules. Therefore, when such electro-optical panel modules are being produced, assembled, or repaired, it is possible to prevent deterioration of images caused by accidental sticking of transparent adhesive 30 onto the center portion of the transparent substrates 31 or 32 functioning as pieces of dust-resistant glass of the electro-optical panels 10 or onto the surface of the prism unit 1112 in the projector; and to prevent the production of defective products. Accordingly, since such problems as increased difficulty in handling such electro-optical panels 10 and increased production of defective products do not occur, the present invention is effective in reducing without any difficulty deterioration of images caused by, for example, overheating of liquid crystals and dust sticking onto a surface of the transparent substrates 31 and 32 or scratches formed thereon when a surface of the transparent substrate 31 and a surface of the transparent substrate 32 are being bonded.

A description will now be given of a second embodiment of the electro-optical panel in accordance with the present invention with reference to FIG. 2. The internal structure of the electro-optical panel 10, itself, of the second embodiment is exactly the same as that of the electro-optical panel 10 of the first embodiment. In addition, the structure of the electro-optical modules, each having the electro-optical panel 10 of the second embodiment provided therein, and the structure of the liquid crystal projector using such electro-optical modules are exactly the same as those of the first embodiment. Therefore, only the differences will be discussed below.

Figure 2:
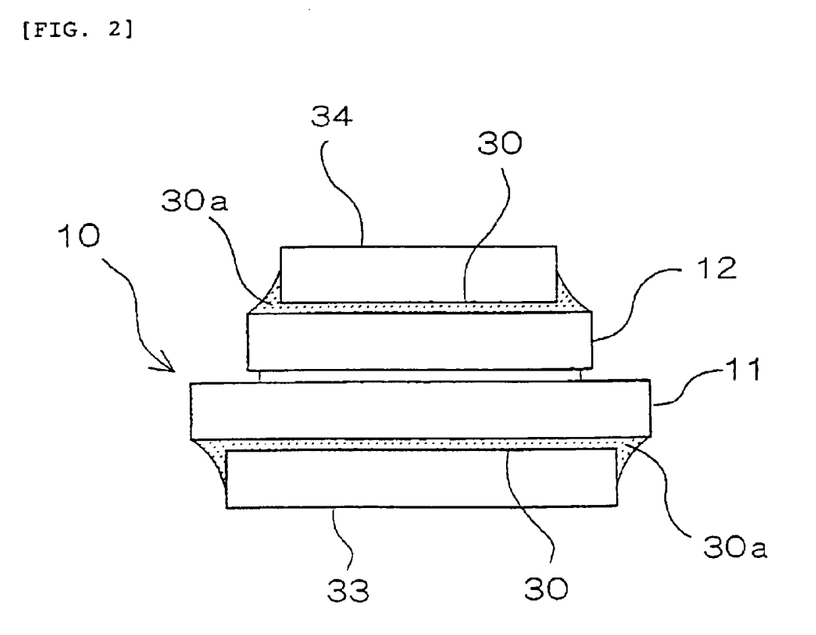
FIG. 2 is a schematic structural view of a second embodiment of the electro-optical panel in accordance with the present invention.

As shown in FIG. 2, in the second embodiment, the area of a transparent substrate 33 is smaller than the area of an element-formed substrate 11. In this case, if the element-formed substrate 11 has a rectangular and planar shape, the two vertical sides and the two horizontal sides of the transparent substrate 33 are shorter than the corresponding two vertical sides and the corresponding two horizontal sides of the element-formed substrate 11. A surface of the transparent substrate 33 is adhered to the outer surface of the element-formed substrate 11 with a transparent adhesive 30. Similarly, the area of a transparent substrate 34 is smaller than the area of an opposite substrate 12. In this case, if the opposite substrate 12 has a rectangular and planar shape, the two horizontal sides and the two vertical sides of the transparent substrate 34 are shorter than the corresponding two vertical sides and the corresponding two horizontal sides of the opposite substrate 12. A surface of the transparent substrate 34 is adhered to the outer surface of the opposite substrate 12. Therefore, stepped portions are formed at both sides of the element-formed substrate 11 and the transparent substrate 33, with adhesion portions 30a being formed between end surfaces of the element-formed substrate 11 and corresponding end surfaces of the transparent substrate 33. Similarly, stepped portions are formed at both sides of the opposite substrate 12 and the transparent substrate 34, with adhesion portions 30a being formed between by end surfaces of the opposite substrate 12 and corresponding end surfaces of the transparent substrate 34. Like the stepped portions in the first embodiment, these stepped portions retain any transparent adhesive 30 that flows from any of the substrates so as to prevent it from flowing from the stepped portions.

A description will now be given of a third embodiment of the electro-optical panel in accordance with the present invention with reference to FIG. 3. The internal structure of the electro-optical panel 10, itself, of the third embodiment is exactly the same as that of the electro-optical panel 10 of the first embodiment. In addition, the structure of the electro-optical panel modules, each having the electro-optical panel 10 of the third embodiment provided therein, and the structure of the liquid crystal projector using such electro-optical panel modules are exactly the same as those of the first embodiment. Therefore, only the differences will be discussed below.

In the third embodiment, end surfaces of a transparent substrate 35, adhered to a surface of an element-formed substrate 11 with a transparent adhesive 30, are formed obliquely so as to extend inwardly towards the element-formed substrate 11 (or adhesion portions 30a). Similarly, end surfaces of a transparent substrate 36, adhered to a surface of an opposite substrate 12 with a transparent adhesive 30, are formed obliquely so as to extend inwardly towards the opposite substrate 12 (or adhesion portions 30a). Therefore, stepped portions are formed at both sides of the element-formed substrate 11 and the transparent substrate 35, with the adhesion portions 30a being formed between the aforementioned end surfaces of the element-formed substrate 11 and the corresponding end surfaces of the transparent substrate 35. Similarly, stepped portions are formed at both sides of the opposing element 12 and the transparent substrate 36, with the adhesion portions 30a being formed between the aforementioned end surfaces of the opposing element 12 and the corresponding end surfaces of the transparent substrate 36. Therefore, as in the first and second embodiments, these stepped portions retain any transparent adhesive 30 that has flown from any one of the substrates so as to prevent it from flowing from the stepped portions.

Figure 3:
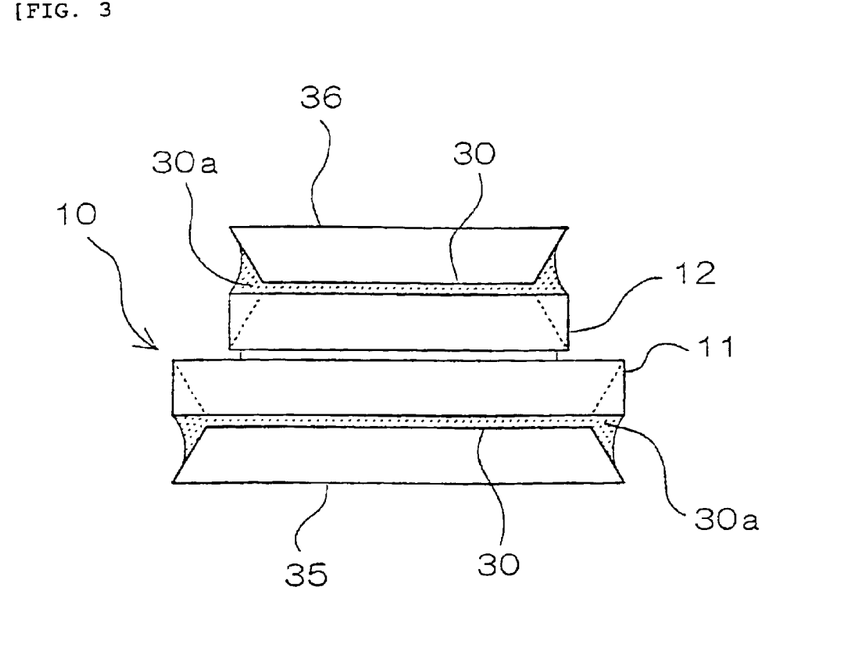
FIG. 3 is a schematic structural view of a third embodiment of the electro-optical panel in accordance with the present invention.

Here, instead of forming end surfaces of the transparent substrates 35 and 36 obliquely, end surfaces of the element-formed substrate 11 and those of the opposite substrate 12 may be formed obliquely as indicated by the dotted lines in FIG. 3. Like the oblique end surfaces of the transparent substrates 35 and 36, these end surfaces of the element-formed substrate 11 and the opposite substrate 12 form stepped portions 30, which retain any transparent adhesive 30. In addition, as shown in FIG. 3, end surfaces of the transparent substrates 35 and 36 and end surfaces of the element-formed substrate 11 and the opposite substrate 12 may be formed obliquely at the same time so that the oblique end surfaces of the element-formed element 11 and the corresponding oblique end surfaces of the transparent substrate 35 extend inwardly toward each other and the oblique end surfaces of the opposite substrate 12 and the corresponding oblique end surfaces of the transparent substrate 36 extend inwardly toward each other. This results in the formation of recesses between the end surfaces on both sides of the corresponding substrates 11 and 35 and the corresponding substrates 12 and 36. The recesses allow the transparent adhesives 30 to be collected and retained there.

Figure 4:
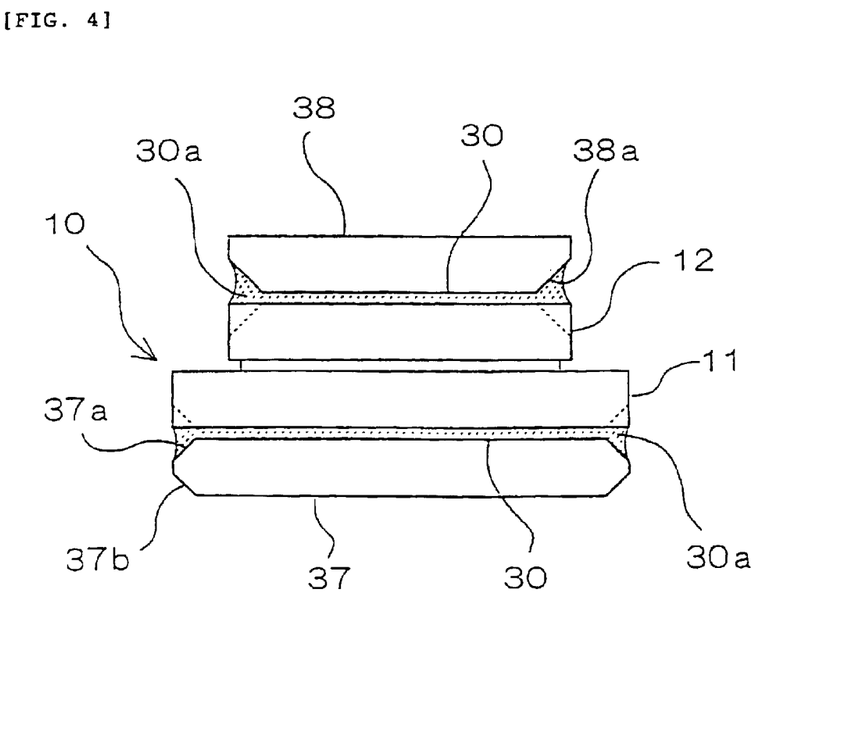
FIG. 4 is a schematic structural view of a fourth embodiment of the electro-optical panel in accordance with the present invention.

A description will now be given of a fourth embodiment of the electro-optical panel in accordance with the present invention with reference to FIG. 4. The internal structure of the electro-optical panel 10, itself, of the fourth embodiment is exactly the same as that of the electro-optical panel 10 of the first embodiment. The structure of the electro-optical panel modules, each having the electro-optical panel 10 of the fourth embodiment provided therein, and the structure of the liquid crystal projector using such electro-optical panel modules are exactly the same as those of the first embodiment. Therefore, only the differences will be discussed below.

In the fourth embodiment, chamfered portions 37a and 37b are formed at end surfaces of a transparent substrate 37, whose surface is adhered to an element-formed substrate 11, in order to form stepped portions at both sides of the transparent substrate 37, with adhesion portions 30a being formed between the chamfered portions 37a and respective end surfaces of the element-formed substrate 11. These stepped portions allow transparent adhesives 30 to be collected and retained there. Similarly, chamfered portions 38a are formed at end surfaces of the transparent substrate 38, whose surface is adhered to an opposite substrate 12, in order to form stepped portions by the chamfered portions 38a and corresponding end surfaces of the opposite substrate 12. These stepped portions allow transparent adhesives 30 to be collected and retained there.

As in each of the above-described embodiments, in the fourth embodiment, it is possible to retain the transparent adhesives 30 and prevent them from flowing out. Here, instead of forming chamfered portions 37a and 38a, or in addition to forming the chamfered portions 37a and 38a, chamfered portions indicated by dotted lines in FIG. 4 may be formed at the transparent substrate 37 side of the element-formed substrate 11 and at the transparent substrate 38 side of the opposite substrate 12. In these cases, recesses in which the adhesion portions 30a are disposed allow the transparent adhesives 30 to be collected and retained there. It is to be noted that even when rounded portions (curved portions) are formed by rounding the corners of the substrates, the same effects are obtained.

In the above-described third embodiment, the end portions of the element-formed substrate 11 and the corresponding end surfaces of the transparent substrate 35, and the end portions of the opposite substrate 12 and the corresponding end surfaces of the transparent substrate 36 are aligned, when viewed in a plane. In the fourth embodiment, the end portions of the element-formed substrate 11 and the corresponding end surfaces of the transparent substrate 37, and the end portions of the opposite substrate 12 and the corresponding end surfaces of the transparent substrate 38 are aligned, when viewed in a plane. Therefore, the third and fourth embodiments provide the advantage that the electro-optical panel 10 can be easily positioned with respect to, for example, the panel-mounting frame 40. In particular, in the fourth embodiment, the panel can be more easily and precisely gripped when it is being positioned or moved, since only a portion of end surfaces of some or all of the substrates is chamfered, and the remaining portion of the end surfaces of some or all of the substrates is formed vertically with respect to their respective substrate planes.

A description will now be given of a fifth embodiment of the electro-optical panel in accordance with the present invention with reference to FIG. 5. In the fifth embodiment, the internal structure of the electro-optical panel 10, itself, is exactly the same as that of the electro-optical panel 10 of the first embodiment. In addition, the structure of the electro-optical panel modules, each having the electro-optical panel 10 of the fifth embodiment provided therein, and the structure of the liquid crystal projector using the electro-optical panel modules are exactly the same. Therefore, only the differences will be discussed below.

As shown in FIG. 6, in the fifth embodiment, the size of the transparent substrate 28, whose surface is adhered to the element-formed substrate 11 with a transparent adhesive 30, is about the same as the size of the transparent substrate 29, whose surface is adhered to the opposite substrate 12 with a transparent adhesive 30. In the fifth embodiment, however, the transparent substrate 28 is out of line with respect to the element-formed substrate 11 in a direction in a plane and adhered together at their surfaces, and the transparent substrate 29 is out of line with respect to the opposite substrate 12 in a direction in a plane and adhered together at their surfaces. Therefore, stepped portions are formed on both sides of the element-formed substrate 11 and the transparent substrate 28, and on both sides of the opposite substrate 12 and the transparent substrate 29, with an adhesion portion 30a being formed between the end surfaces of the element-formed substrate 11 and the respective end surfaces of the transparent substrate 28, and an adhesion portion 30a being formed between the end surfaces of the opposite substrate 12 and the respective end surfaces of the transparent substrate 29. These stepped portions allow the transparent adhesives 30 to be collected and retained there.

Figure 5:
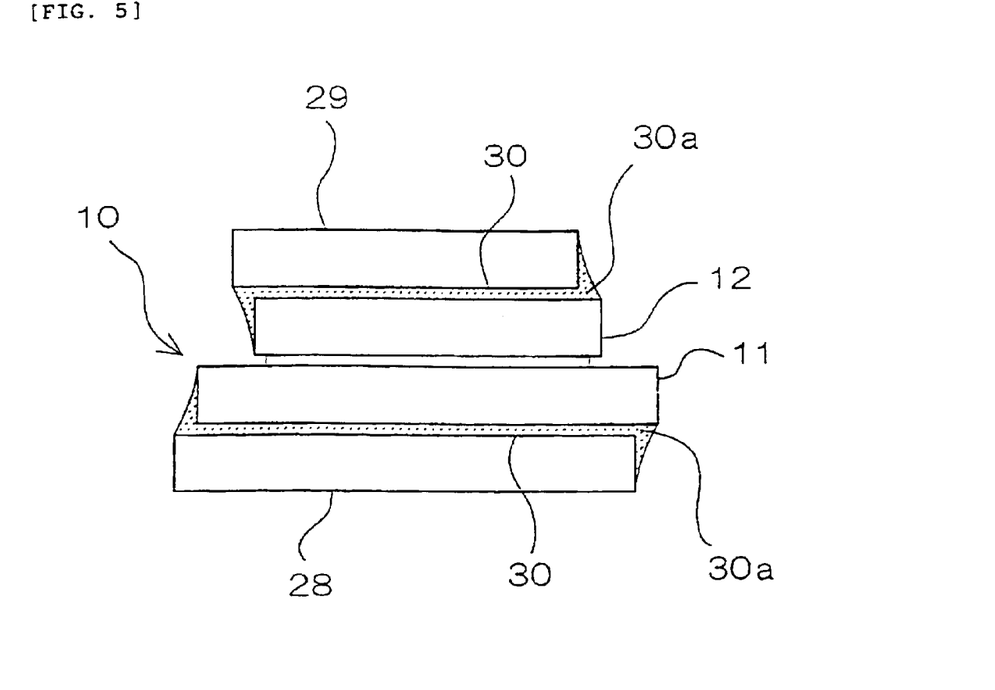
FIG. 5 is a schematic structural view of a fifth embodiment of the electro-optical panel in accordance with the present invention.

Although in the fifth embodiment the transparent substrate 28 is shifted in the horizontal direction with respect to the element-formed substrate 11 in FIG. 5, and the transparent substrate 29 is shifted in the horizontal direction with respect to the opposite substrate 12 in FIG. 5, they may also be positioned out of line with respect to their corresponding element-formed substrate 11 and the opposite substrate 12 in a direction in a plane of the sheet on which FIG. 5 is drawn, whereby stepped portions can be formed along the entire periphery of the substrates 11, 12, 28, and 29 by the end surfaces of the element-formed substrate 11 and the respective end surfaces of the transparent substrate 28 and by the end surfaces of the opposite substrate 12 and the respective end surfaces of the transparent substrate 29. The transparent substrate 28 and the element-formed substrate 11 may be formed with the same size. Similarly, the transparent substrate 29 and the opposite substrate 12 may be formed with the same size. Since it is not necessary to form the end surfaces of the substrates with special shapes, manufacturing processes can be easily performed without greatly changing them from conventional manufacturing processes.

Figure 11:
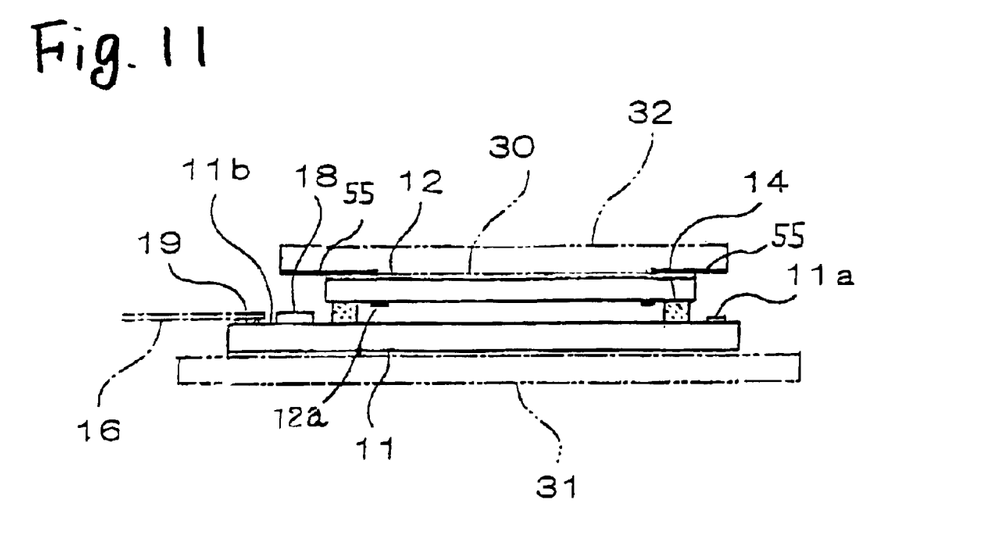
FIG. 11 is a sectional view schematically illustrating the internal structure of the electro-optical panels of the sixth embodiment.

A description will now be given of a sixth embodiment of the electro-optical panel in accordance with the present invention with reference to FIG. 11. FIG. 11 shows the cross sectional view of FIG. 8 showing the internal structure of the electro-optical panel of the first embodiment. The internal structure of the electro-optical panel 10, itself, of the sixth embodiment is substantially the same as that of the electro-optical panel 10 of the first embodiment. In addition, the structure of the electro-optical panel modules, each having the electro-optical panel 10 provided therein, and the structure of the liquid crystal projector using such electro-optical panel modules are exactly the same as those of the first embodiment. Therefore, only the differences will be discussed below.

In the sixth embodiment, as same as the first embodiment, the size of the transparent substrate 31, whose surface is adhered to the element-formed substrate 11 with a transparent adhesive 30, is larger than the size of the element substrate 11, Further, the size of the transparent substrate 32, whose surface is adhered to the opposite substrate 12 with a transparent adhesive 30, is larger than the size of the opposite substrate 12. It means that the end surfaces of the transparent substrates 31 and 32 are disposed outwardly of the end surfaces of the element-formed substrate 11 and the opposite substrate 12, respectively. The sixth embodiment, however, is different from the first embodiment in that the light shielding member 55 is formed along the all peripheral regions of at least one of the transparent substrates 31 and 32. More specifically, the light shielding member 55 formed of, for example, a metal such as chrome or aluminum, or a carbon is provided. The shielding member 55 is overlapped to the sealant 14 as viewed in plane, and is disposed along the peripheral region of the transparent substrate 32. The shielding member 55 is formed such that the inner ends of it positions above the inner ends of the sealant 14 and extends outward. Since the light shielding member 55 project outward over the sealant 14, the light shielding member 55 blocks off the light which is going to obliquely enter the sealant 14, when the incident light from the transparent 32 side travels through the opposite substrate 12 and then is emitted from the element-formed substrate 11. Therefore, in case that the thin film transistors are formed in the display region of the element-formed substrate 11, the aforementioned structure allows the light shielding member 55 to prevent the scattered light generated by the sealant 14 from entering the thin film transistors, and thus also prevent the deterioration of the thin film transistor characteristics. It means that in case that the outer ends of the opposite substrate 12 is equal or extends over that of the transparent substrate 32, is it not possible to block off the light from obliquely entering the sealant 14 even if the light shielding member 55 is provided on the transparent substrate 32, because in such structure, the ending surface of the transparent substrate 32 positions on or inner than the position of the sealant 14. On the other hands, in the case that the outer ends of the transparent substrate 32 extends over the outer ends of the opposite substrate 12, as described in the sixth embodiment, the light shielding member 55 formed on the transparent substrate 32 can be extended to the outer than sealant 14, and therefore, the light which is going to enter the sealant 14 can be blocked off. Further, in the structure that the light shielding member 55 is formed so as to cover the light shielding film 12a formed on the opposite substrate 12, as viewed in plane, it is also possible to prevent the light from leaking out around the substrate other than display region, and thereby realizing a display with high contrast.

Figure 12:
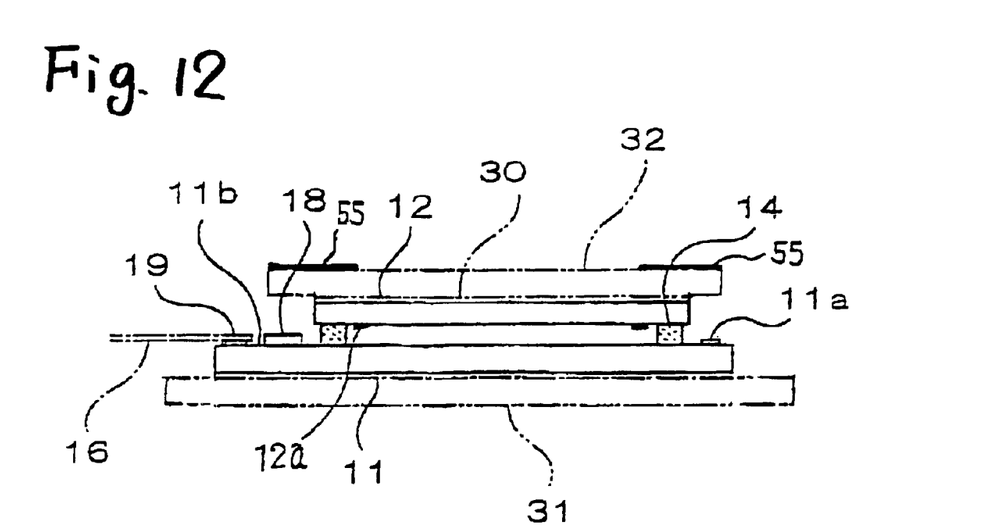
FIG. 12 is a sectional view schematically illustrating the internal structure of the electro-optical panels of the seventh embodiment.

A description will be given of the seventh embodiment of the electro-optical panel in accordance with the present invention with reference to FIG. 12. FIG. 12 is a cross-sectional view of FIG. 8 showing the internal structure of the electro-optical panel of the first embodiment. The internal structure of the electro-optical panel 10, itself, of the seventh embodiment is substantially the same as that of the electro-optical panel 10 of the first embodiment. In addition, the structure of the electro-optical panel module, each having the electro-optical panel 10 provided therein, and the structure of the liquid crystal projector using such electro-optical panel module are exactly the same as the first embodiment. Therefore, only the differences will be discussed below.

In the seventh embodiment, the size of the transparent 31, the surface of which is adhered to the surface of the element-formed substrate 11 with the transparent adhesive 30, is larger than that of the transparent substrate 11. Further, the size of the transparent substrate 32, the surface of which is adhered to the surface of the opposite substrate 12 with the transparent adhesive 30, is larger than that of the opposite substrate 12. The seventh embodiment is the same as the sixth embodiment in that the light shielding member 55 is formed along the of the all peripheral region of the transparent substrate 31 and the transparent substrate 32. However the seventh embodiment is different from the sixth embodiment in the position of the light shielding member provided on the transparent substrate 31 and the transparent substrate 32. In this embodiment, the light shielding member is provided on the rear side of the surface facing the liquid crystal layer of the transparent substrate 31 and the transparent substrate 32. In this structure, the light which is going to obliquely enter the sealant 14, can be effectively blocked off.

In the aforementioned sixth and seventh embodiments, the light shielding member 55 may be disposed on both or on either one of the transparent substrates 31 and 32. In order to block off the reflection light traveling from the element-formed substrate side, it is effective to provide the light shielding member 55 along the peripheral of the transparent substrate 32.

In each of the above-described embodiments, a transparent substrate is adhered to a surface of both of the element-formed substrate 11 and the opposite substrate 12 of the electro-optical panel 10. However, a surface of a transparent substrate may be adhered to the outer surface of either one of the element-formed substrate 11 and the opposite substrate 12.

In each of the above-described embodiments, stepped portions or recesses are formed by the corresponding end surfaces of the set of two substrates to be adhered together at the surfaces thereof. Transparent adhesives 30 are collected and retained there. However, stepped portions may be formed at a location of an end surface of either one of the two substrates to be adhered together (that is, at a portion of an end surface of either one of the two substrates to be adhered together that is located in the vicinity of and is slightly separated from its corresponding adhesion portion 30a). In this case too, the transparent adhesives 30 are collected and retained there. Although in each of the above-described embodiments the end surfaces of each of the substrates 11, 12, 28, and 29 are formed into a planar shape, regardless of whether they are formed obliquely or in the vertical direction with respect to their respective substrate planes, they do not have to be formed into flat surfaces as long as stepped portions or recesses for retaining transparent adhesives 30 are formed by the end surfaces of the two substrates to be adhered together. For example, they may be formed into curved surfaces.

Although not illustrated, instead of forming stepped portions by the end surfaces of the first substrate and the corresponding end surfaces of the third substrate, or in addition to forming stepped portions by the end surfaces of the first substrate and the corresponding end surfaces of the third substrate, grooves may be formed at peripheral portions of the first substrate and the third substrate at the side opposing the adhesive. These grooves make it possible to reduce the amount of adhesive which flows out. When such a structure is used, so that adhesives are collected in the grooves, the adhesive strength is increased and the amount of adhesive which flows out is reduced.

Although the above-described element-formed substrate 11 and opposite substrate 12 were described as being transparent substrates, the present invention is not limited thereto. In, for example, a reflective electro-optical panel, an opaque substrate, such as a silicon substrate, is sometimes used for one of the substrates. It is obvious that the present invention is applicable to a structure using an opaque substrate for one of the substrates.

Advantages

As can be understood from the foregoing description, according to the present invention, since defocusing occurs when an outer surface is separated from an electro-optical substance as a result of adhering a surface of the third substrate, it is possible to prevent reduced display quality caused by dust or scratches on the outer surface of the first substrate. In addition, it is possible to increase the heat capacity of the electro-optical panel, and to reduce deterioration of the display quality caused by overheating of the electro-optical substance. By forming stepped portions by the end surfaces of the first substrate and the corresponding end surfaces of the third substrate (with an adhesion portion being formed therebetween), or by forming stepped portions near corresponding adhesion portions, or by forming recesses in which an adhesion portion is disposed, any adhesive which has overflown from a substrate can be collected and retained by its corresponding stepped portion or recess, making it possible to prevent any adhesive which has overflown from the substrate to flow from the corresponding stepped portion or recess. Therefore, during the manufacturing process or after the manufacturing process, it is possible to eliminate the problem of difficulty in handling an electro-optical panel due to sticking of transparent adhesive on an outer surface of the electro-optical panel; or the problem of increased production of defective electro-optical panels due to adhesives sticking onto a light-transmissive portion of the electro-optical panels. In addition, it is possible to increase adhesive strength between the first substrate and the third substrate, since the adhesive is hardened while it is retained in a stepped portion or a recess.

What is claimed is:

1. An electro-optical panel comprising:
    a first substrate;
    a second substrate adhered to the first substrate with a sealant;
    an electro-optical substance sandwiched between an inside surface of the first substrate and an inside surface of the second substrate; and
    a third substrate disposed above the outer side of at least one of the first substrate and the second substrate, the third substrate being formed of a same material as the at least one of the first substrate and the second substrate, the size of the third substrate being larger than the size of the first substrate, the position of the end surface of the first substrate being disposed inwardly of the third substrate, and a shielding member being disposed on the third substrate, along the peripheral region of the third substrate.

2. The electro-optical panel according to claim 1, the light shielding member being disposed toward the surface facing the electro-optical substance of the third substrate.

3. The electro-optical panel according to claim 1, the light shielding member being disposed toward the reverse side of the surface of the electro-optical substance of the third substrate.

4. The electro-optical panel according to claim 1, the surface of the first substrate being adhered to the surface of the third substrate with adhesive.

5. An electro-optical panel comprising:

a first substrate;

a second substrate adhered to the first substrate with a sealant;

an electro-optical substance sandwiched between an inside surface of the first substrate and an inside surface of the second substrate; and a third substrate disposed above the outer side of at least one of the first substrate and the second substrate, the size of the third substrate being larger than the size of the first substrate, the position of the end surface of the first substrate being disposed inwardly of the third substrate, a shielding member being disposed on the third substrate, along the peripheral region of the third substrate, the incident light from the third substrate side traveling through the first substrate and being emitted from the second substrate, and the light shielding member overlapping the sealant and extending outward over the sealant as viewed in plane.

6. The electro-optical panel according to claim 5, light shielding film being disposed on either of the first substrate and the second substrate so as to be disposed inwardly of the sealant, and the light shielding member and the light shielding film overlapping each other as viewed in plane.

* * * * *